United States Patent [19]

Koziatek

[11] Patent Number: 5,663,630
[45] Date of Patent: Sep. 2, 1997

[54] TRANSPONDER CHARGING APPARATUS

[75] Inventor: Stanley Koziatek, Corning, N.Y.

[73] Assignee: K-G Motors, Inc., Horseheads, N.Y.

[21] Appl. No.: 591,998

[22] Filed: Jan. 26, 1996

[51] Int. Cl.$^6$ .......................... H01M 10/44; H01M 10/46
[52] U.S. Cl. ............................. 320/49; 320/59; 320/61
[58] Field of Search .............................. 320/49, 53, 57, 320/59, 61, DIG. 2

[56] References Cited

U.S. PATENT DOCUMENTS

| | | | |
|---|---|---|---|
| 4,365,241 | 12/1982 | Morishita | 340/636 |
| 4,412,168 | 10/1983 | Sell | 320/59 X |
| 5,153,497 | 10/1992 | Eiden | 320/61 |
| 5,184,694 | 2/1993 | Magrath, Jr. et al. | 180/167 |

Primary Examiner—Peter S. Wong
Assistant Examiner—Patrick B. Law
Attorney, Agent, or Firm—George R. McGuire

[57] ABSTRACT

Apparatus for automatically charging a transponder mounted to a go-cart. The transponder charging unit is basically comprised of a housing having a wall which divides its space into first and second compartments wherein a PC board and a transponder are at least partially contained, respectively. A cover plate secures and protects the PC board and transponder within the housing. A wire is spliced into the go-cart's coil grounding wire to extract A/C power therefrom and send it to the PC board. The PC board contains several solid state devices to rectify and regulate the voltage. Wires extend from the PC board's output to charging contacts operatively connected to the transponder's battery, thereby providing a charge thereto. Thus, the transponder's battery, is continually being charged while the go-cart's engine is running.

22 Claims, 3 Drawing Sheets

TRANSPONDER CHARGING APPARATUS

BACKGROUND OF THE INVENTION

The present invention generally relates to devices for charging batteries, and more particularly to a vehicle mounted device for charging a transponder.

Go-cart racing has become an increasingly popular recreational activity throughout the United States. Typically, many go-carts driven by people of all ages race for several laps around a long, winding, closed track. The cart that finishes the predetermined number of laps first is generally rewarded in some manner, thereby simulating the procedures followed in professional auto racing.

Traditionally, an employee of the track will be positioned adjacent the finish line and manually keep track of what racing order the carts are running. The employee may even post the carts' number in the order they're running on a scoreboard, thereby giving the drivers and spectators an idea of how the race is progressing. This method of keeping track of the carts running order is tedious, often times inaccurate, and a waste of employee resources.

A more efficient and reliable system has developed which utilizes transponders mounted in each cart. The transponders continuously transmit to a computer, via radio frequency signals, a cart's position on the track. The computer then keeps track of the carts running order. This information, in turn, can, if desired, be electronically displayed on a scoreboard.

While a transponder based tracking system is far more efficient than a manual tracking system, it still requires manual maintenance. After each race, or at the end of a day, each transponder mounted to a cart must be removed and placed in a recharging unit for several hours. When they are done recharging, they must be manually mounted back to the carts.

It is therefore a principal object of the present invention to provide a device which will automatically recharge a transponder while it remains mounted to a go-cart.

It is an additional object of the present invention to provide a transponder charging unit that is durable and will not be affected by dust, dirt, and other debris.

It is a further object of the present invention to provide a transponder charging unit that is easy and inexpensive to manufacture.

It is yet another object of the present invention to provide a transponder charging unit that derives its power directly from a go-cart's engine.

Other objects and advantages of the present invention will in part be obvious and in part appear hereinafter.

SUMMARY OF THE INVENTION

In accordance with the foregoing objects and advantages, the present invention provides a transponder charging unit used in combination with a go-cart and its component parts. The transponder is a conventional radio frequency (RF) transmitting device powered by an internal battery. The present invention is particularly adapted for use with a transponder manufactured by AMB Products B.V. of Heemstede, Holland.

The transponder charging unit is generally comprised of a housing defining a space wherein a printed circuit board (PC board) and a transponder are at least partially contained. The input of the PC board receives a wire lead from the go-cart's engine coil ground wire, and includes voltage rectifying and regulating means incorporated therein. The rectified and reduced voltage is then sent from the PC board's outlet to the transponder's battery by wire leads extending from the PC board. Thus, the transponder's battery is continually charged while the go-cart's engine is operating. Accordingly, the transponder never needs to be removed from the go-cart for charging purposes.

The housing includes a wall therein which divides the internal space into two compartments. The PC board and transponder are cooperatively received within respective compartments. Once the PC board is set into the housing, it is coated with an epoxy to seal it therein. Further, the epoxy protects the PC board from dust, dirt, and other debris which may infiltrate the housing. In addition, a removable cover encloses the housing, thereby preventing debris from entering the housing.

The transponder includes a body portion and an RF antenna. The body portion is entirely contained within the housing, and is cooperatively positioned with respect to metal charging contacts mounted in the housing for transmitting power to the transponder's battery. An opening in the housing' cover permits the transponder's RF antenna to extend therethrough, thereby not impeding any transmitted signal.

BRIEF DESCRIPTION OF THE DRAWINGS

The foregoing and other features of the invention will be more readily understood and fully appreciated from the following Detailed Description, taken in conjunction with the accompanying drawing figures, wherein.

DETAILED DESCRIPTION

Figure 1:
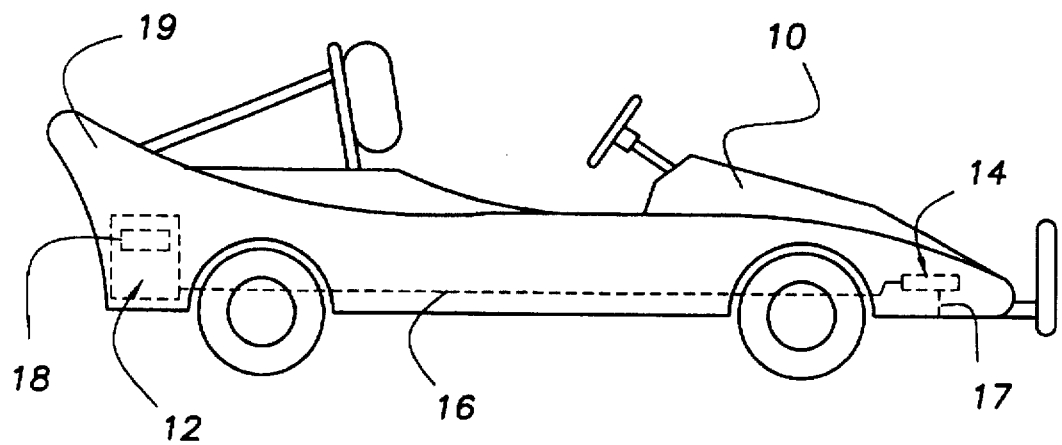
FIG. 1 is a side elevational view of a go-cart illustrating the positioning of the present invention with respect to the go-cart's engine.
Figure 2:
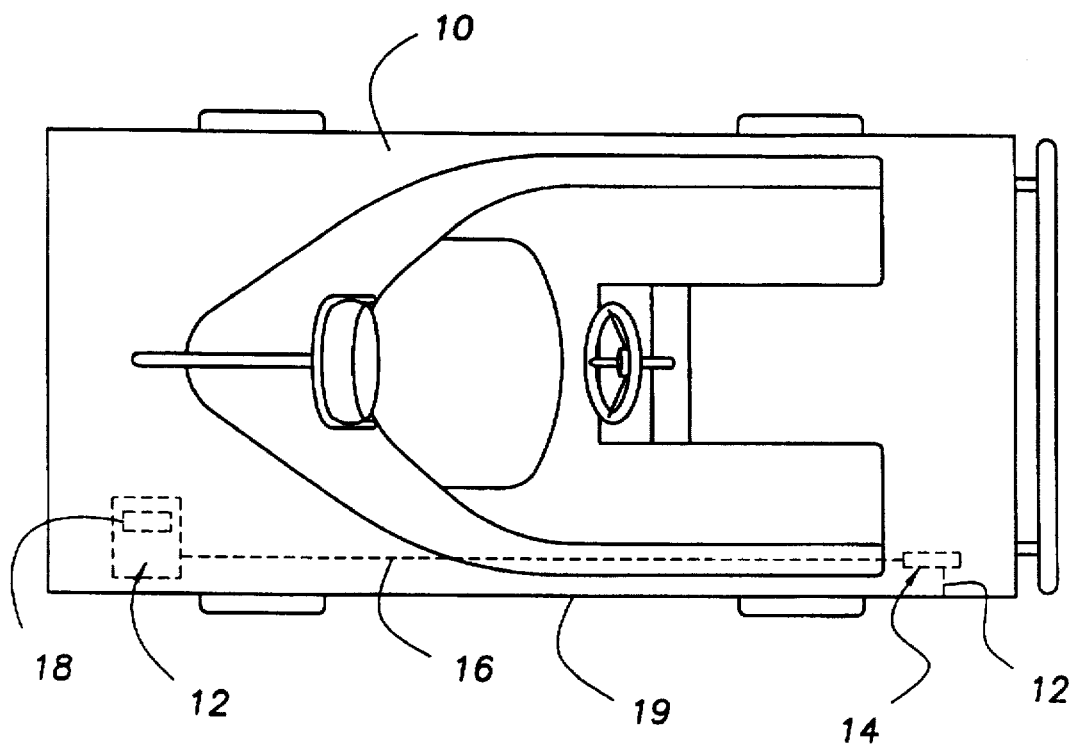
FIG. 2 is a top plan view thereof.

Referring now to the drawing figures wherein like reference numerals refer to like parts throughout, there is seen in FIGS. 1 and 2 a conventional go-cart 10 having an engine and a transponder charging unit, denoted generally by reference numerals 12 and 14, respectively, positioned therein. A wire 16 electrically bridges engine 12 to charging unit 14. A second wire 17 extends between charging unit 14 and the cart's chassis 19 to provide a ground connection. Although charging unit 14 and engine 12 are shown mounted at the front and rear of go-cart 10, respectively, charging unit 14 could be mounted anywhere else on go-cart 10 with equal success.

Go-cart 10, as with all go carts, includes a simple engine 10, but does not include a primary battery, as there are no electrical components which require power. Engine 10 includes a coil (and the coil's ground wire), denoted generally 18, which provides the AC power necessary for a spark to be sent to a single cylinder via a spark plug. As go-cart 10, and all go-carts, includes only one cylinder there is no need for a distributor, and thus the spark is sent directly to the sole cylinder. Of course, coil ground wire 18 must fire twice per cycle; once on the cylinder's compression stroke and another on the exhaust stroke. Since the AC power produced by coil ground wire 18 is only needed for the compression stroke, the AC power created during the exhaust stroke is typically wasted. The present invention utilizes the AC power created during the exhaust stroke by sending it through wire 16 to charging unit 14. Wire 16 is spliced into coil ground wire 18 at one end thereof, and soldered to the input of a PC board 24 at its other end. A grounding wire 17 extends between chassis 19 and the input of PC board 24.

Figure 3:
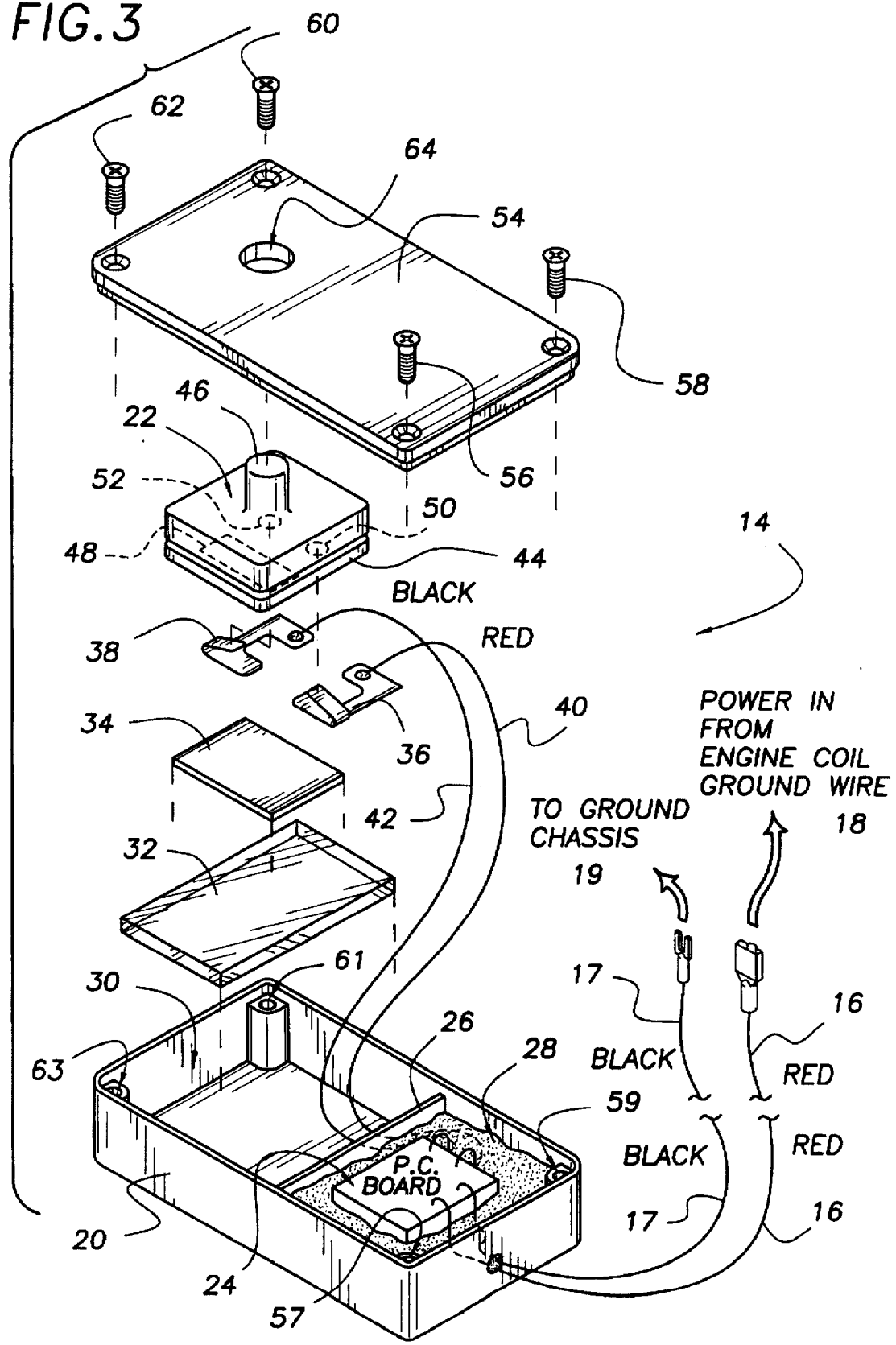
FIG. 3 is an exploded view of the present invention.

Referring now to FIG. 3, charging unit 14 is seen to be generally comprised of a housing 20 which defines a space wherein a conventional transponder 22 and a PC board 24 are at least partially contained. Housing 20 includes a wall 26 positioned in the defined space and dividing the space into two compartments 28 and 30. PC board 24 is fixedly secured within compartment 28 and is coated with an epoxy to prevent dust, dirt, or other debris from affecting its function. A transponder mounting block is fixedly secured within compartment 30, and a transponder positioning block 34 is adapted to be positioned atop mounting block 32.

Fixedly secured to the outwardly facing surface of positioning block 34 are a pair of metal charging contacts, a positive 36 and a negative 38. Contacts 36 and 38 cooperatively receive wires 40 and 42, respectively, extending from the output of PC board 24. Wires 40 and 42 transmit the rectified and regulated voltage which was initially provided by coil ground wire 18 and sent to PC board 24 via wires 16 and 17, and are soldered at one end to the output of PC board 24 and at their opposite ends to contacts 36 and 38, respectively. Contacts 36 and 38 may be of the leaf spring type as shown in the drawings, or simply flat metal contacts.

Transponder 22 includes a body portion 44 and an RF antenna 46 extending outwardly from body portion 44. Housed within body portion 44 is a battery 48 which may be charged through its positive and negative contacts 50 and 52, respectively. Transponder 22 may be securely positioned atop positioning block 34 with metal contacts 36 and 38 being positioned in contacting relation to battery contacts 50 and 52, respectively.

Once transponder 22 is appropriately contained within housing 20, cover plate 54 may be securely attached to housing 22 via screws 56, 58, 60, and 62 to further contain and protect the housed elements. Screws 56, 58, 60 and 62 are cooperatively received in screw receiving bored holes 57, 59, 61 and 63, respectively, integrally formed at the corners of housing 20. Cover plate 54 includes an opening 64 which permits RF antenna 46 to extend therethrough. Thus, cover plate 54 must be positioned such that RF antenna 46 and opening 64 are cooperatively aligned.

Figure 4:
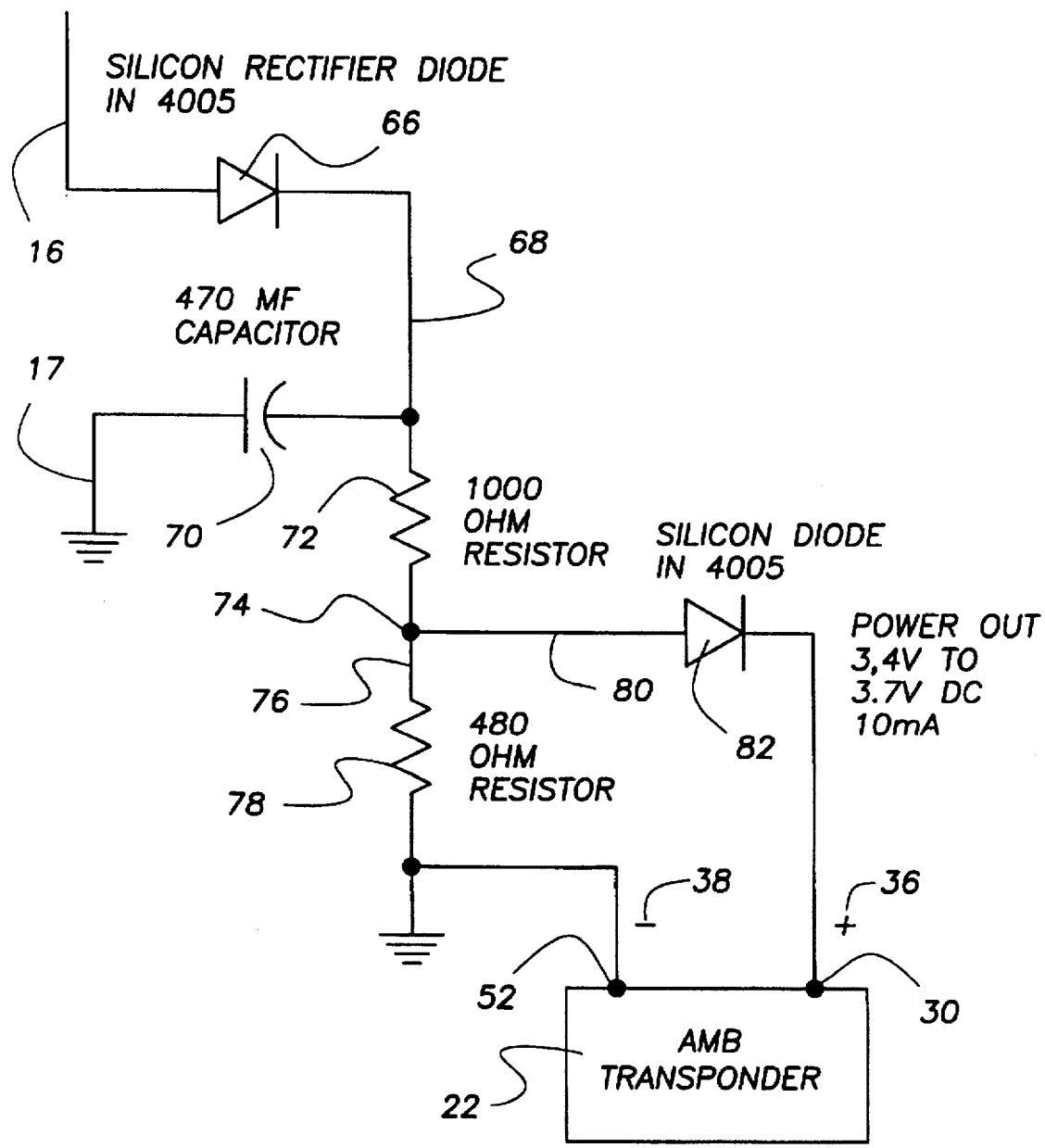
FIG. 4 is a schematic view of the PC board portion of the present invention.

PC board 24, shown schematically in FIG. 4, contains several solid state devices to rectify and regulate the voltage coming from coil ground wire 18. As previously discussed, the A/C power supplied by coil ground wire 18 is sent to the input of the input of PC board 24 via wire 16. The voltage then passes through a silicon rectifier diode 66 to rectify the A/C pulse to continuous, and D/C where it is sent along run 68. Simultaneously, wire 17 is ground and is connected in series to run 68. A capacitor 70 is positioned between ground and run 68 to prevent any energy from escaping to ground, and thereby acting essentially as a filter to ensure a constant D/C flow through the circuit. The D/C voltage is then slightly reduced by a resistor 72 having a first predetermined value such as 1000 Ω, before reaching node 74 at which point the D/C voltage is split. Half of the D/C voltage passing through node 74 then passes along run 76 and through a second resistor 78 having a second predetermined value, such as 480 Ω, and eventually to negative metal contact 38 and ground. Second resistor 78 will cause some of the current to be joined with the other half of the D/C voltage passing through node 74 and along run 80. The current passing through run 80 then passes through a silicon diode 82 before continuing along run 84 to the positive metal contact 36, which then transfers the current to battery terminal 50, thereby charging transponder battery 48. Diode 82 prevents any current from passing back through the circuit once transponder battery 48 is fully charged, which, of course, would result in battery 48 draining itself of its charge.

It should be noted that the values and precise arrangement of parts described herein are for illustrative purposes only, and the scope of the patent should not be limited thereto, but should extend in accordance with full scope and spirit of the following claims.

What is claimed is:

1. In a go-cart having an engine, a ground chassis and a coil providing an AC electrical power supply, and a racing transponder unit including a battery having first and second terminals, means for charging said battery comprising:

a) voltage rectifying and regulating means;
  b) a first wire connecting said ground chassis to said voltage rectifying and regulatory means;
  c) a second wire connecting said AC power supply to said voltage rectifying and regulatory means;
  d) third and fourth wires connecting said voltage rectifying and regulating means to said first and second terminals of said battery; and
  e) housing means defining a space wherein both said transponder and said voltage rectifying and regulating means are at least partially contained.

2. The invention according to claim 1 wherein said coil includes a grounding wire and said AC electrical power supply is taken from said grounding wire.

3. The invention according to claim 2 wherein said voltage rectifying and regulating means comprise a plurality of solid-state devices mounted on a printed circuit board.

4. The invention according to claim 3 wherein said solid state devices comprise at least one silicon rectifier diode.

5. The invention according to claim 3 wherein said printed circuit board is mounted in close physical proximity to said transponder.

6. The invention according to claim 5 wherein said coil and said transponder are mounted upon said go-cart at substantially the rear and front ends thereof, respectively.

7. The invention according to claim 1 wherein said voltage rectifying and regulating means comprise a plurality of solid state devices mounted on a printed circuit board.

8. The invention according to claim 7 wherein said housing means includes wall means dividing said space into at least two compartments, and said transponder and said voltage rectifying and regulating means are contained in separate ones of said compartments.

9. The invention according to claim 1 wherein said housing means includes a removable cover.

10. The invention according to claim 9 wherein said transponder includes a body portion and an RF antenna, said body portion being entirely contained within said space and said antenna extending from said body portion and through an opening in said cover.

11. The invention according to claim 10 wherein said coil and said housing means are mounted upon said go-cart at substantially opposite ends thereof.

12. The invention according to claim 1 wherein said transponder includes a body portion wherein said battery is housed and a pair of charging contacts exposed on the exterior of said body portion, said third and fourth wires being connected to said battery terminals through said charging contacts.

13. The invention according to claim 12 and further including mounting means for holding said transponder in a predetermined position upon said go-cart, and a pair of fixed contacts, said third and fourth wires being respectively connected to said fixed contacts and said charging contacts being in engagement with said fixed contacts when said transponder is in said predetermined position.

14. The invention according to claim 13 and further including housing means defining said predetermined position, and containing said voltage regulating and rectifying means and said fixed contacts.

15. The invention according to claim 1 further comprising means for preventing said battery from losing its charge.

16. The invention according to claim 15 wherein said voltage rectifying and regulating means includes a plurality of solid state devices mounted on a printed circuit board.

17. The invention according to claim 16 wherein said charge loss prevention means includes a diode mounted on said printed circuit board in close proximity to one of said third and fourth wires.

18. Means for charging an on-board transponder unit of a racing go-cart during normal operation thereof, said go-cart having an engine with a coil attached thereto which provides sufficient A-C power to operate said go-cart, said charging means comprising:
   a) voltage rectifying and regulating means having an input adapted to receive AC power at a first voltage and current level and an output providing DC power at a second voltage and current level suitable for charging said transponder;
   b) first means electrically connecting said voltage rectifying and regulating means input to a source of AC power on said go-cart, said first means comprising first and second wires each having first and second opposing ends and each being connected at said first end to said voltage rectifying and regulating means, and respectively connected at said second end to said coil grounding wire and to ground potential;
   c) second means electrically connecting said voltage rectifying and regulating means output to said transponder; and
   d) said transponder including a body portion having a pair of externally exposed charging contacts, and said second means comprising third and fourth wires each having first and second opposite ends and each being connected at said first end to said voltage rectifying and regulating means and respectively connected at said second end to said pair of charging contacts.

19. The invention according to claim 18 and further including housing means wherein said voltage rectifying and regulating means and said transponder are at least partially contained.

20. A method of charging an on-board transponder of an engine powered racing go-cart without removal of said transponder from said go-cart, said method comprising:
   a) providing voltage rectifying and regulating means having an input adapted to receive AC power at a first voltage and current level and an output providing DC power at a voltage and current level suitable for charging said transponder;
   b) electrically connecting said input to a source of AC power on said go-cart at said first voltage and current level; and
   c) connecting said output to charging contacts of said transponder.

21. The method of claim 20 wherein said source of AC power is a coil grounding wire attached to said engine.

22. The method of claim 21 wherein said voltage rectifying and regulating means comprises a plurality of solid state devices mounted on a printed circuit board, and further comprising the step of mounting both said printed circuit board and said transponder in common housing means on said go-cart.

* * * * *